United States Patent [19]

Tate

[11] 3,921,718

[45] Nov. 25, 1975

[54] METHOD FOR STIMULATING WELL PRODUCTION

[75] Inventor: Jack F. Tate, Houston, Tex.

[73] Assignee: Texaco Inc., New York, N.Y.

[22] Filed: Dec. 20, 1974

[21] Appl. No.: 534,984

[52] U.S. Cl. .................................. 166/307; 166/308
[51] Int. Cl.² ...................... E21B 43/27; E21B 43/26
[58] Field of Search.... 166/307, 308, 271, 273–275, 166/270, 281, 282, 259; 252/8.55 C, 8.55 D; 175/64

[56] References Cited
UNITED STATES PATENTS

| | | | |
|---|---|---|---|
| 1,891,667 | 12/1932 | Carr | 166/307 |
| 2,038,720 | 4/1936 | Groote | 166/307 |
| 2,681,889 | 6/1954 | Menaul et al. | 166/307 |
| 3,353,603 | 11/1967 | Knight | 166/307 |
| 3,434,545 | 3/1969 | Bombardieri | 166/307 |
| 3,441,085 | 4/1969 | Gidley | 166/307 |
| 3,704,751 | 12/1972 | Tate | 166/307 |
| 3,724,544 | 4/1973 | Tate | 166/271 |
| 3,749,169 | 7/1973 | Tate | 166/271 |
| 3,791,446 | 2/1974 | Tate | 166/307 |

OTHER PUBLICATIONS
The Condensed Chemical Dictionary, Eighth Edition, Van Nostrand Reinhold Co., N.Y., 1971, p. 848

*Primary Examiner*—Stephen J. Novosad
*Attorney, Agent, or Firm*—T. H. Whaley; C. G. Ries; James F. Young

[57] ABSTRACT

The production of hydrocarbons from a subterranean hydrocarbon-bearing formation containing acid-soluble components, such as one composed at least in part of dolomite or limestone, is stimulated by injecting into the formation a composition comprising an aqueous solution of a mineral acid having dissolved therein a compound hereinafter described. The elimination of plugging of capillary openings within the formation and mineral scale deposition on production equipment due to post-precipitation of dissolved salts subsequent to acidization by means of the said compound results in a substantial improvement in hydrocarbon recovery.

16 Claims, No Drawings

METHOD FOR STIMULATING WELL PRODUCTION

FIELD OF THE INVENTION

This invention relates to a method for stimulating the production of fluids from earthen formations. More particularly, this invention relates to a method in which the productivity of a hydrocarbon-bearing formation containing acid-soluble components and with or without water-sensitive clays or shales is improved upon treatment of the formation with an aqueous solution of a mineral acid and a compound as hereinafter described, said compound effecting the elimination of plugging of capillary openings due to post-precipitation of dissolved salts subsequent to the acidization as well as effecting elimination of mineral scale on production equipment such as pumps, tubing, etc. caused by such precipitation.

DESCRIPTION OF THE PRIOR ART

The technique of increasing the permeability of a subterranean hydrocarbon-bearing formation and of removing obstructing acid-soluble mineral scale for the purpose of stimulating the production of fluids therefrom has long been practiced in the art. One such method commonly employed is known as acidizing which is widely utilized in treating subsurface acid-soluble geological formations, eg, limestone, dolomite, etc. The technique is not limited to application in formations of high acid solubility. Sandstone and gypsum-containing formations may require acidization if the produced water is unstable with respect to $CaCO_3$. In the usual well-acidizing procedure, a non-oxidizing mineral acid is introduced into the well and under sufficient pressure is forced into the adjacent subterranean formation where it reacts with formation components, and deposited mineral scale, particularly the carbonates such as calcium carbonate, magnesium carbonate, etc. to form the respective salt of the acid, carbon dioxide and water. The usual mineral acid employed in such acidization procedures is hydrochloric acid.

During the acidizing process passageways for fluid flow are created or existing passageways therein are enlarged thus stimulating the production of oil, water, brines and carious gases. If desired, the acidization may be carried out at an injection pressure sufficiently great to create fractures in the strata or formation which has the desired advantage of opening up passageways into the formation along which the acid can travel to more remote areas from the well bore. The salt formed upon neutralization of the acid is extensively water soluble and is readily removed by reverse flow from the formation via the well bore.

There are, however, troublesome complications attending the use of hydrochloric acid or other similar non-oxidizing mineral acids. In the acidizing process, the following primary beneficial reaction occurs: $CaCO_3 + 2HCl \rightarrow CaCl_2 + H_2O + CO_2$. Under the higher pressures required to conduct an acidization, the $CO_2$ is dissolved in the reaction mixture consisting of spent acid and connate water: $CO_2 + H_2O \leftrightarrow H_2CO_3 \leftrightarrow H^+ + HCO_3^- \leftrightarrow 2H^+ + CO_3^=$. The equilibria may be summarized and written:

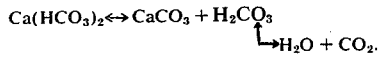

After acidization is completed, the well is often back-flowed in the case of a water injection well (in order to clean out formation and tubing) and put back on production in the case of a producing oil or gas well. In both cases, pressure diminishes, $CO_2$ breaks out of solution, inducing $CaCO_3$ to precipitate. Such precipitation, when it occurs within the capillaries of a tight formation or on the tubing or annulus as a mineral scale, can severely lessen production or injection rate by plugging such capillaries or well equipment.

It is known that molecularly dehydrated polyphosphates are effective in retarding $CaCO_3$ precipitation. These polyphosphates are unsatisfactory in the method of the present invention because they undergo rapid hydrolysis in the presence of the mineral acid component required in the method of the present invention. As a result, the scale inhibiting properties of these polyphosphates are destroyed. In addition, one hydrolytic reaction product, the phosphate ion ($PO_4^{-3}$), can precipitate with calcium $^{+2}$ or barium $^{+2}$ ions present in the produced water, causing additional plugging or scale deposition, further aggravating the problem. The so-called "glassy" phosphates are known scale inhibitors. However, these glassy phosphates are unsatisfactory because of their slight solubility in acidic media and the tendency to form objectionable hydrolytic reaction products.

It is also known to employ various organic polymers to prevent the precipitation of mineral salts. Many of these polymeric materials are unstable in mineral acids. In such acidic media they undergo spontaneous depolymerization to an ineffective species. A representative polymeric material which undergoes such hydrolysis in the presence of acids is polyacrylamide. In addition, this polymer has a further disadvantage in that it is unstable in aqueous media at temperatures of about 300°F. and upwards. Many wells that may be treated by the method of the present invention have bottom hole temperatures of 250°–300°F. or higher.

The chemically altered natural polymers and natural polymers themselves, are effective inhibitors to prevent the precipitation of mineral salts. However, some materials such as sodium carboxymethylcellulose precipitate or decompose in the presence of mineral acids. Other known sequestering agents such as citric or tartaric acids, and/or complexing agents such as ethylenediaminetetraacetic acid and its water-soluble salts are known inhibitors to prevent the deposition of boiler scale in aqueous media. However, such materials are not applicable in the method of the present invention because they are not appreciably surface active and do not adsorb on the formation face.

It is therefore, the principal object of the present invention to overcome the defects of the prior art in acidizing fluid bearing formations such as hydrocarbon-bearing formations, etc., by providing a method of acidization employing the novel composition of this invention.

SUMMARY OF THE INVENTION

This invention encompasses and includes a method of increasing the production of fluids from a subterranean fluid-bearing formation having present acid-soluble components comprising injecting down the well bore to said formation and therefrom into said formation under a pressure greater than the formation pressure an aqueous acidizing composition hereinafter more fully described, maintaining said composition in contact with the formation strata for a time sufficient for the acid to chemically react with the acid-soluble components of the formation and/or acid-soluble mineral scale deposited on production equipment to etch or enlarge passageways through the strata and remove the scale and thereby increase substantially the flow capacity of the said subterranean formation.

The novel aqueous acidizing composition of this invention comprises an aqueous solution of a non-oxidizing mineral acid, such as hydrochloric or sulfuric acid, having dissolved therein a compound hereinafter described. The concentration of acid present in the subject composition is such that it is capable of reacting with the acid-soluble components of the fluid-bearing strata.

DETAILED DESCRIPTION OF THE INVENTION

In its broadest embodiment the method of the present invention comprises introducing into a subsurface formation containing acid-soluble components an aqueous acid solution of a compound hereinafter described, wherein the said solution is maintained in contact with the formation for a time sufficient to chemically react with the formation and/or acid-soluble mineral scale deposited on production equipment so as to increase substantially the flow capabilities of the formation and to release carbon dioxide concomitantly whereby a beneficial effect due to the mutual miscibility of carbon dioxide in the fluid phases is realized as a reduction in viscosity and retentive capillary forces, while another beneficial effect in the form of increased formation energy, due to the pressure generated by the released carbon dioxide.

An advantage resulting from the employment of the method of this invention in acidizing fluid-bearing formations is that the post-precipitation of dissolved carbonates is prevented or materially decreased. Such post-precipitation occurs because of the nature of the dissolution reaction:

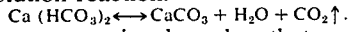

When pressure is released so that spent reaction products from the acidization process can be removed, carbon dioxide gas can break out of solution, causing post-precipitation of calcium carbonate. Such post-precipitation occurring within the formation matrix near the bore hole can decrease permeability by plugging the formation capillaries, particularly those near the well bore, and result in a lower production rate. Furthermore, such post-precipitation can occur in the tubing or annulus of the well itself and manifest itself as mineral scale, reducing their diameter(s) and resulting in a lower production rate.

The compound useful in preparing the aqueous acidic solution of the present invention is a water soluble substituted taurine having the following general formula:

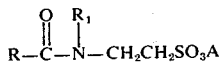

wherein R and $R_1$ are aliphatic hydrocarbon groups, both either saturated or unsaturated (except for the methyl group), each of said groups R and $R_1$ containing from 1 to 20 carbon atoms therein, the sum total of the carbon atoms in both R and $R_1$ being between 9 and 30, and A is an alkali metal or ammonium ion.

Representative substituted taurines include those wherein either the R group or the $R_1$ group is methyl, ethyl, propyl, butyl, pentyl, hexyl, heptyl, octyl, nonyl, decyl, undecyl, tridecyl, tetradecyl, pentadecyl, hexadecyl, heptadecyl, octadecyl, nonadecyl, and eicosyl, including the branched chain and unsaturated variants thereof, such as oleyl. It is to be understood that mixtures of these above named R and $R_1$ groups can be used, such as those obtained from coconut, tall oil, tallow and palm oils.

The preferred class of substituted taurines are those wherein the $R_1$ substituent is a relatively low molecular weight aliphatic hydrocarbon group such as methyl, ethyl, propyl, isopropyl, butyl or isobutyl and the other substituent R, is a saturated or unsaturated including branched chain, aliphatic hydrocarbon containing between 8 and 20 carbon atoms including more specifically such hydrocarbons derived from the coconut, palm and tall oil acids etc., high in oleyl groups.

Preferably the aqueous acid composition of this invention is one comprising an aqueous solution which may include brine and from about 0.5 to about 28 percent, preferably 3 to 15 percent by weight of a non-oxidizing mineral acid, such as hydrochloric acid and which contains therewith between from about 0.005 to about 2 percent, preferably from about 0.05 to about 1 percent, by weight of the aforesaid compound.

Generally, the aqueous acidic solution will contain an inhibitor to prevent or greatly reduce the corrosive attack of the acid on metal. Any of a wide variety of compounds known in the art and employed for this purpose can be used, e.g., certain compounds of arsenic, nitrogen or sulfur as described be Grebe et al. in U.S. Pat. No. 1,877,504. The amount of the inhibitor utilized is not highly critical and it may be varied widely. Usually this amount is defined as a small but effective amount, e.g., from 0.02 to about 2.0 percent by weight.

In carrying out the method of this invention, a solution containing the desired amount of the non-oxidizing mineral acid dissolved in water is first prepared. An inhibitor to prevent corrosion of acid on the metal equipment associated with the well is usually added with mixing in the next step. The compound in an amount within the stated concentration range is then admixed with the aqueous acid solution. The thus-prepared acid solution is forced, usually via a suitable pumping system, down the well bore and into contact with the production equipment and formation to be treated. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with inown fracturing procedures, may be employed in admixture with the aqueous acidic solution. Generally, it is advisable to allow the aqueous acid solution to remain in contact with the formation and production equipment until the acid therein has been substantially depleted by reaction with the acid-soluble components of the formation and the deposited scale. After this, the substantially spent treating solution is reversed out of the well, i.e., it is allowed to flow back out or to be pumped out of the formation. Further, as those skilled in the art will understand, the concentrations of the compound and acid components should be chosen to provide an acidizing fluid of the desired rheological properties.

In the method of this invention, the compound component of the composition provides means whereby calcium ions have tendencies to precipitate as $CaCO_3$ from a supersaturated solution of $CaCO_3$ or $Ca(HCO_3)_2$ that is produced by the reaction of acid component with the formation, or previously deposited acid-soluble mineral scale, combine with the compound moiety to form a highly stable complex therein so that solid calcium carbonate does not precipitate from the spent treating solution. This binding up of the aforementioned calcium ions from weakly ionizable compounds permits the formed complex to remain dissolved in the treating solution and pass through the formation pores and production equipment.

Further, the compound component of the aqueous acidic solution of the invention provides means whereby the nucleation and growth of the solid itself is thwarted, so that solid calcium carbonate does not precipitate from the spent treating solution.

Finally, the compound provides means whereby continuous protection against post-precipitation of $CaCO_3$ is obtained for a considerably period of time subsequent to treatment due to continuous slow desorption of the component from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate to occur from such treating solution with the likelihood of plugging the formation passageways and production equipment during subsequent recovery of desirable formation hydrocarbons therethrough.

If desired, one can also add to the aqueous acidic solution containing the compound a polymeric material to retard the acid components tending to attack the calcareous components of the formation. Suitably, a polyvinylpyrrolidone, as more particularly described in U.S. Pat. No. 3,749,169, issued July 31, 1973, is particularly desirable and the disclosure of said patent is herein incorporated by reference.

EXAMPLE I

A producing well in East Texas can be treated in the following manner.

A treating mixture is prepared by mixing 10 barrels of salt water containing about 2.6 percent sodium chloride and 12 barrels of 20 percent by weight aqueous hydrochloric acid. There is added thereto 0.15 barrel of a compound consisting of sodium N, N- methyloleoyltaurate.

The treating mixture is squeezed into the formation at a rate of about 1/2 BPM at 450 psig. The shut-in tubing pressure is 450 psig which is bled down to zero in a short time. The well can then be returned to production.

EXAMPLE II

A treating mixture is prepared from 10 barrels of salt water (2.6 percent sodium chloride) and 10 barrels of 12 percent by weight aqueous hydrochloric acid solution containing 0.2 barrel of the same admixture. The aqueous acidic solution is injected into the producing formation in the manner approximating that used in Example I. Thereafter 20 barrels of water are used to overflush the treated formation by injection down the tubing, followed by injection of 5 barrels of water down the casing. The well is then able to be returned to production.

EXAMPLE III

The aqueous acidic solution of Example II is injected into another producing formation. An overflush of 10 barrels of water is used to force the aqueous acidic solution into the formation by injection down the tubing. The well is able to be returned to production.

It is significant that the admixture is an effective material in the presence of high calcium ion concentrations of the order of up to 10,000 ppm or more.

EXAMPLE IV-IX

The procedure set forth in Examples I–III above is repeated using:

Example IV–VI Sodium N, N-methylpalmitoyltaurate.

Example VII–IX Sodium N, N-methyl tall oil acid taurate.

The compounds used in the present invention are temperature stable and effective as scale inhibitors at temperatures up to about 150°C. e.g. 100°–150°C.

The compound of Examples I–III above can be prepared in the following manner:

The sodium salt of taurine, $NH_2CH_2CH_2SO_3Na$, is reacted with methyl amine to prepare the intermediate sodium N-methyltaurate. This intermediate is reacted with the acid chloride of oleic acid to complete the preparation of sodium N, N-methyloleyltaurate. The conditions under which this known reaction is conducted is well known in the art, including obvious variations thereof.

Obviously, other modifications and variations of the invention as hereinbefore set forth may be made without departing from the spirit and scope thereof and therefore only such limitations should be imposed as are indicated in the appended claims.

I claim:

1. A method of increasing the production of fluids from a subterranean fluid-bearing formation having present therein acid-soluble components comprising injecting down the well bore penetrating said formation and injecting therefrom into said formation under a pressure greater than the formation pressure, an aqueous acidic solution containing from about 0.5 to about 28 percent by weight of a mineral acid having a compound therein in an amount of from about 0.005 to about 2 percent by weight, said compound being a water-soluble substituted taurine having the following general formula:

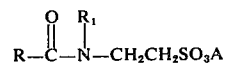

wherein R and $R_1$ are aliphatic hydrocarbon groups, including the corresponding unsaturated aliphatic hydrocarbons, mixtures and isomers, each group containing from 1 to 20 carbon atoms therein, the sum total of the carbon atoms in R and $R_1$ being between 9 and 30, and A is an alkali metal or ammonium ion, maintaining said solution in contact with the formation and production equipment for a time sufficient for the acid to chemically react with the acid-soluble components of the formation to etch passageways therethrough thereby increasing substantially the flow capacity of the said subterranean formation.

2. Method as claimed in claim 1 wherein said compound is present in said aqueous acidic solution in an amount of from about 0.05 to about 1 percent weight.

3. Method as claimed in claim 1, wherein the $R_1$ substituent of said substituted taurine is a low molecular weight aliphatic hydrocarbon group containing from one to four carbon atoms therein.

4. Method as claimed in claim 1, wherein the R substituent of said substituted taurine is at least one member selected from the group consisting of saturated aliphatic hydrocarbons, unsaturated aliphatic hydrocarbons, branched chain isomers and mixtures of said hydrocarbons.

5. Method as claimed in claim 1, wherein said substituted taurine is the sodium salt of N, N-methyloleoyltaurate.

6. Method as claimed in claim 1, wherein said substituted taurine is the sodium salt of N, N-methylpalmitoyltaurate.

7. Method as claimed in claim 1, wherein said substituted taurine is the sodium salt of N, N-methylacyl taurate, said acyl substitutent being obtained from tall oil acids.

8. Method as claimed in claim 1, wherein in said substituted taurine, R is a mixture of aliphatic hydrocarbon groups obtained from coconut oil acids.

9. Method as claimed in claim 1, wherein in said substituted taurine, R is a mixture of aliphatic hydrocarbon groups obtained from tallow oil acids.

10. Method as claimed in claim 1, wherein in said substituted taurine, R is a mixture of aliphatic hydrocarbon groups obtained from tall oil acids.

11. Method as claimed in claim 1 wherein said acid is present in the solution in an amount of from about 3 to about 15 percent by weight.

12. Method as claimed in claim 1 wherein said acid is hydrochloric acid.

13. Method as claimed in claim 1 wherein said acid is sulfuric acid.

14. Method as claimed in claim 1 wherein the said formation is a hydrocarbon-bearing formation.

15. Method as claimed in claim 1 wherein the said aqueous solution is injected down the well bore penetrating said formation under a pressure greater than the formation pressure and sufficient to create fractures in the formation.

16. Method as claimed in claim 1 wherein the said aqueous acidic solution is injected down the well bore penetrating said formation under a pressure greater than the formation pressure but less than the pressure required to create fractures in the formation.

* * * * *